United States Patent
Shen et al.

(10) Patent No.: US 11,554,999 B2
(45) Date of Patent: Jan. 17, 2023

(54) INFLATION SYSTEMS FOR EVACUATION SLIDES AND LIFE RAFTS

(71) Applicant: GOODRICH CORPORATION, Charlotte, NC (US)

(72) Inventors: Guangqing Shen, Phoenix, AZ (US); Jeffrey Martin Werbelow, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 231 days.

(21) Appl. No.: 17/075,453

(22) Filed: Oct. 20, 2020

(65) Prior Publication Data

US 2021/0147314 A1     May 20, 2021

Related U.S. Application Data

(60) Provisional application No. 62/935,778, filed on Nov. 15, 2019.

(51) Int. Cl.
*B64D 25/14* (2006.01)
*C06D 5/04* (2006.01)

(52) U.S. Cl.
CPC .............. *C06D 5/04* (2013.01); *B64D 25/14* (2013.01)

(58) Field of Classification Search
CPC .............. B64D 25/14; B01J 7/00; C06D 5/04
See application file for complete search history.

(56) References Cited

U.S. PATENT DOCUMENTS

| | | | | |
|---|---|---|---|---|
| 2,839,073 A | * | 6/1958 | Marsh | F16K 15/202 137/232 |
| 3,473,641 A | | 10/1969 | Fisher | |
| 3,723,205 A | * | 3/1973 | Scheffee | B01J 7/00 149/19.91 |
| 3,840,057 A | * | 10/1974 | Lesh, Jr. | B64D 25/14 193/25 B |
| 4,004,614 A | * | 1/1977 | Mackal | F16K 15/202 137/232 |
| 4,013,247 A | * | 3/1977 | Giffin | B64D 25/14 193/25 B |
| 5,343,889 A | * | 9/1994 | Jaw | F16K 15/205 137/232 |

(Continued)

FOREIGN PATENT DOCUMENTS

| | | |
|---|---|---|
| EP | 3595668 | 5/1994 |
| EP | 3406524 | 11/2018 |

(Continued)

OTHER PUBLICATIONS

Euroepan Patent Office, European Search Report dated Mar. 25, 2021 in Application No. 20207847.3.

*Primary Examiner* — Hai Phan
*Assistant Examiner* — Son M Tang
(74) *Attorney, Agent, or Firm* — Snell & Wilmer L.L.P.

(57) ABSTRACT

An inflation system for an evacuation system may comprise an inflator and a controller operationally coupled to the inflator. The inflator may include a solid gas generating material and an igniter configured to ignite in response to receiving an ignite signal. The solid gas generating material may be configured to generate a gas in response to an ignition of the igniter. The controller may be configured to send the ignite signal to the inflator.

18 Claims, 12 Drawing Sheets

(56) References Cited

U.S. PATENT DOCUMENTS

| | | | | |
|---|---|---|---|---|
| 5,351,711 | A * | 10/1994 | Peter | F16K 15/202 |
| | | | | 137/232 |
| 5,820,773 | A * | 10/1998 | Hintzman | B64D 25/14 |
| | | | | 193/25 B |
| 5,836,610 | A * | 11/1998 | Rink | B60R 21/01526 |
| | | | | 280/736 |
| 5,851,027 | A * | 12/1998 | DiGiacomo | B60R 21/272 |
| | | | | 280/736 |
| 6,004,176 | A * | 12/1999 | Moran | B63C 9/24 |
| | | | | 417/191 |
| 6,129,380 | A * | 10/2000 | Rink | C06D 5/04 |
| | | | | 280/741 |
| 6,170,867 | B1 * | 1/2001 | Rink | B60R 21/264 |
| | | | | 280/736 |
| 6,460,560 | B1 * | 10/2002 | Weinheimer | F16K 15/205 |
| | | | | 137/232 |
| 6,474,684 | B1 * | 11/2002 | Ludwig | C06D 5/06 |
| | | | | 280/736 |
| 6,648,367 | B2 * | 11/2003 | Breed | B60R 21/30 |
| | | | | 280/730.1 |
| 6,990,994 | B2 * | 1/2006 | Reeb | F16K 15/205 |
| | | | | 137/232 |
| 7,032,778 | B2 | 4/2006 | Bock et al. | |
| 7,721,915 | B2 | 5/2010 | Bock et al. | |
| 7,841,482 | B2 * | 11/2010 | Fletcher | F16K 15/20 |
| | | | | 220/203.11 |
| 10,151,396 | B2 * | 12/2018 | Nguyen | B65D 31/147 |
| 11,221,082 | B2 * | 1/2022 | Huang | F16K 15/205 |
| 2003/0006587 | A1 * | 1/2003 | Jang | B60R 21/231 |
| | | | | 280/730.2 |
| 2003/0034641 | A1 * | 2/2003 | Zimbrich | B60R 21/272 |
| | | | | 280/741 |
| 2003/0141703 | A1 * | 7/2003 | Fowler | B60R 21/233 |
| | | | | 280/728.2 |
| 2004/0000617 | A1 * | 1/2004 | Baker | B64D 25/14 |
| | | | | 244/129.1 |
| 2004/0195457 | A1 | 10/2004 | Baker | |
| 2004/0262901 | A1 * | 12/2004 | Brewster | B60R 21/268 |
| | | | | 280/741 |
| 2005/0109398 | A1 * | 5/2005 | Huang | F16K 15/207 |
| | | | | 137/223 |
| 2005/0205160 | A1 * | 9/2005 | Ganachaud | B60K 15/04 |
| | | | | 141/351 |
| 2009/0058058 | A1 * | 3/2009 | Finnigan | B23K 11/3081 |
| | | | | 280/736 |
| 2014/0137790 | A1 * | 5/2014 | Noca | B63B 7/00 |
| | | | | 114/345 |
| 2015/0091279 | A1 * | 4/2015 | Anderson | B60R 21/233 |
| | | | | 280/729 |
| 2015/0123387 | A1 * | 5/2015 | Nakamura | D06M 15/693 |
| | | | | 280/741 |
| 2019/0010962 | A1 * | 1/2019 | White | F04F 5/18 |
| 2019/0344954 | A1 * | 11/2019 | Chou | B65D 83/24 |

FOREIGN PATENT DOCUMENTS

| | | |
|---|---|---|
| GB | 1204341 | 9/1970 |
| GB | 2343152 | 5/2000 |
| WO | 2012105604 | 8/2012 |

* cited by examiner

INFLATION SYSTEMS FOR EVACUATION SLIDES AND LIFE RAFTS

CROSS REFERENCE TO RELATED APPLICATIONS

This application claims priority to, and the benefit of, U.S. Provisional Application Ser. No. 62/935,778, titled "INFLATION SYSTEMS FOR EVACUATION SLIDES AND LIFE RAFTS," filed Nov. 15, 2019, which is incorporated herein by reference in its entirety for all purposes.

FIELD

The present disclosure relates to inflation systems, and more specifically to inflation systems and methods of forming inflation systems for evacuation slides and life rafts.

BACKGROUND

An evacuation system may include an inflatable that helps passengers disembark from an aircraft or other vehicle in the event of an emergency or other evacuation event. Inflatable slides may deploy from a door sill or a side of the aircraft fuselage. Inflatable life rafts may be employed for water evacuations. The inflation system for the inflatable typically includes an aspirator, a pressurized cylinder, a regulator valve, and other hardware (e.g., pressure release valves, etc.). The inflation system adds to the envelope size and overall weight of the evacuation system.

SUMMARY

An inflation system for an inflatable is disclosed herein. In accordance with various embodiments, the inflation system may comprise a first inflator and a controller operationally coupled to the first inflator. The first inflator may include a solid gas generating material and an igniter configured to ignite in response to receiving a first ignite signal. The solid gas generating material may be configured to generate a gas in response to an ignition of the igniter. The controller may be configured to send the first ignite signal to the first inflator.

In various embodiments, a second inflator may be operationally coupled to the controller. The controller may be configured to send a second ignite signal to the second inflator. The controller may be configured to send the first ignite signal to the first inflator prior to sending the second ignite signal to the second inflator.

In various embodiments, a first sensor may be in communication with the controller. A tangible, non-transitory memory may be configured to communicate with the controller, the tangible, non-transitory memory having instructions stored thereon that, in response to execution by the controller, cause the controller to perform operations, which may comprise receiving, by the controller, an output from the first sensor; and determining, by the controller, an ignition sequence for the first inflator and the second inflator based on the output from the first sensor.

In various embodiments, the first sensor may be configured to measure at least one of a temperature, a wind speed, or a sill height. In various embodiments, a second sensor may be in communication with the controller. The second sensor may be configured to measure a pressure of the inflatable.

In various embodiments, the inflatable may include at least one of an evacuation slide or a life raft. In various embodiments, the inflatable may comprise an evacuation slide, and the first inflator may be located closer to a head end of the evacuation slide as compared to the second inflator.

An evacuation system is also disclosed herein. In accordance with various embodiments, the evacuation system may comprise an inflatable and a first inflator configured to inflate the inflatable. The first inflator may include a solid gas generating material and an igniter configured to ignite in response to receiving a first electrical signal. The solid gas generating material may be configured to generate a gas in response to an ignition of the igniter. A controller may be operationally coupled to the first inflator and configured to send the first electrical signal to the first inflator.

In various embodiments, a second inflator may be operationally coupled to the controller. The second inflator may include a second ignitor configured to ignite in response to receiving a second electrical signal from the controller. In various embodiments, the controller may be configured to send the first electrical signal prior to the second electrical signal.

In various embodiments, a first sensor may be in communication with the controller. The first sensor may be configured to measure at least one of a temperature, a wind speed, or a sill height. A tangible, non-transitory memory may be configured to communicate with the controller, the tangible, non-transitory memory having instructions stored thereon that, in response to execution by the controller, cause the controller to perform operations, which may comprise receiving, by the controller, at least one of a temperature measurement, a wind speed measurement, or a sill height measurement from the first sensor; and determining, by the controller, an ignition sequence for the first inflator and the second inflator based on the at least one of the temperature measurement, the wind speed measurement, or the sill height measurement.

In various embodiments, a second sensor may be in communication with the controller. The second sensor may be configured to measure a pressure of the inflatable.

In various embodiments, the first inflator may include a nozzle located at an end of the first inflator opposite the solid gas generating material, and a seal configured to form a sealing interface with the inflatable. A portion of the first inflator, extending from the seal to the nozzle, may be located in an internal volume defined by the inflatable.

In various embodiments, a first panel may be located in an interior volume of the inflatable. The first inflator may be located through the first panel.

In various embodiments, a second panel may be located in the interior volume of the inflatable, and the first inflator may be located through the second panel. The first panel may define a panel opening. In various embodiments, a second inflator may be located through the first panel. A first nozzle of the first inflator may be oriented away from a second nozzle of the second inflator.

A method of forming an inflation system is also disclosed herein. In accordance with various embodiments, the method may comprise the steps of attaching a first inflator to an inflatable tube, operationally coupling a controller to the first inflator, and configuring the controller to send a first ignite signal to the first inflator. The first inflator may include a solid gas generating material and an igniter configured to ignite in response to receiving an electrical signal. The solid gas generating material may be configured to generate a gas in response to an ignition of the igniter.

In various embodiments, the method may further comprise the steps of attaching a second inflator to the inflatable tube, and configuring the controller to send a second ignite signal to the second inflator.

In various embodiments, the method may include operationally coupling a sensor to the controller, and configuring the controller to determine an ignition sequence for sending the first ignite signal and the second ignite signal based on an output from the sensor.

In various embodiments, attaching the first inflator to the inflatable tube may include locating a housing of the first inflator within a volume defined by the inflatable tube.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
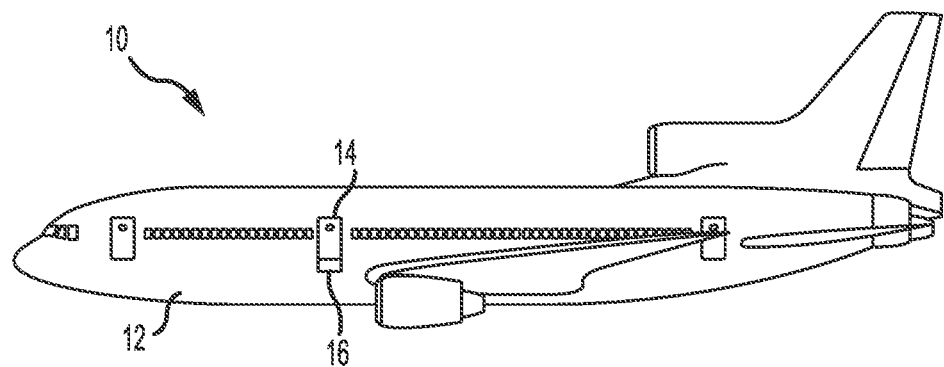
FIG. 1 illustrates an aircraft having an evacuation system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Evacuation systems according to the present disclosure may include an inflatable (e.g., an evacuation slide and/or a life raft) and an inflation system configured to inflate the inflatable. In accordance with various embodiments, the inflation systems may include one or more pyrotechnic inflator(s) mounted on or within the inflatable, and a controller operationally coupled to the pyrotechnic inflators. The pyrotechnic inflators may include a solid gas generating material and an igniter configured to ignite the solid gas generating material. In accordance with various embodiments, ignition of the pyrotechnic inflators is controlled to regulate a deployment of the inflatable. In accordance with various embodiments, the controller may be configured to send ignite signals to the pyrotechnic inflators using a predetermined sequence, or based on sensor readings at different environmental conditions. Evacuation systems inflated via pyrotechnic inflators may have a decreased size and/or reduced weight as compared to traditional evacuation systems, wherein the inflatable is inflated via gas housed in a charge cylinder. Inflation systems having pyrotechnic inflators tend to allow for increased control over the deployment of the inflatable. Additionally, inflation systems having pyrotechnic inflators may reduce or eliminate a need for regular inspection of the evacuation systems, which tends to increase service intervals and reduce costs.

With reference to FIG. 1, an exemplary aircraft 10 is shown, in accordance with various embodiments. Aircraft 10 may comprise a fuselage 12 having plurality of exit doors, including an exit door 14. Aircraft 10 may include one or more evacuation systems positioned near a corresponding exit door. For example, aircraft 10 includes an evacuation system 16 positioned near exit door 14. In the event of an emergency, exit door 14 may be opened by a passenger or crew member of aircraft 10. In various embodiments, evacuation system 16 may deploy in response to exit door 14 being opened or in response to another action taken by a passenger or crew member such as depression of a button or actuation of a lever.

Figure 2:
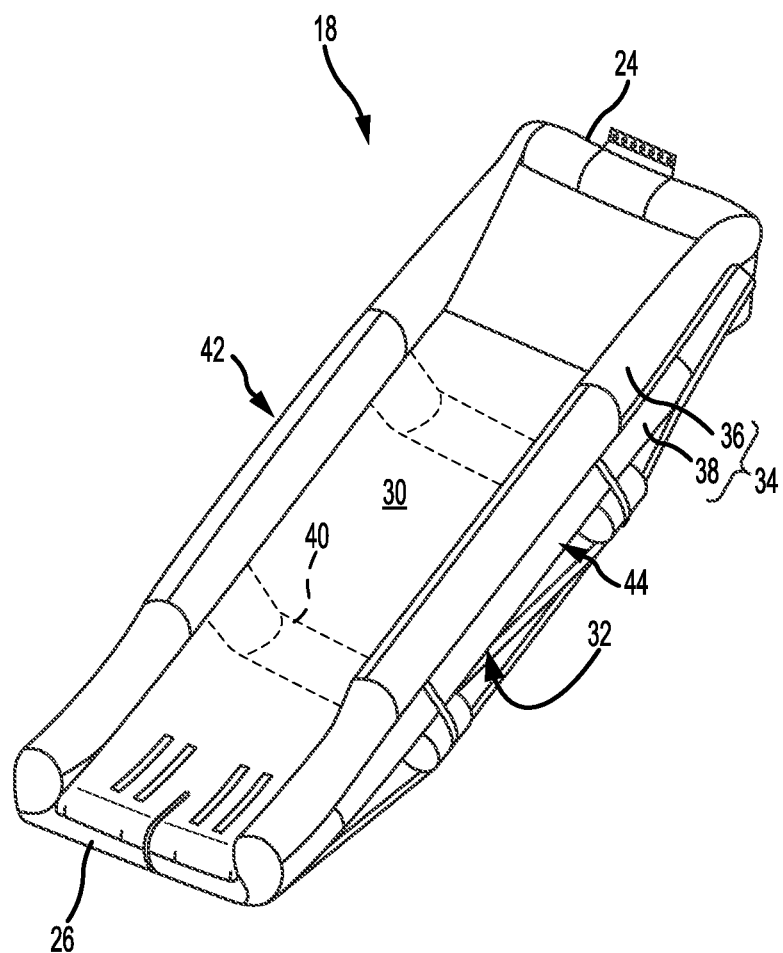
FIG. 2 illustrates a perspective view of an evacuation slide in a deployed position, in accordance with various embodiments.

With reference to FIG. 2, an evacuation slide 18 of evacuation system 16 is illustrated in an inflated or "deployed" position. In accordance with various embodiments, evacuation slide 18 includes a head end 24 and a toe end 26 opposite head end 24. Head end 24 may be coupled to an aircraft structure (e.g., fuselage 12 in FIG. 1). In accordance with various embodiments, evacuation slide 18 is an inflatable slide. In various embodiments, evacuation slide 18 may be employed as a life raft in the event of a water landing. Evacuation slide 18 includes a sliding surface 30 and an underside surface 32 opposite sliding surface 30. Sliding surface 30 extends from head end 24 to toe end 26. In response to an evacuation event (i.e., to deployment of evacuation slide 18), underside surface 32 may be oriented toward an exit surface (e.g., toward the ground or toward a body of water). While evacuation slide 18 is illustrated as a single lane slide, it is contemplated and understood that evacuation slide 18 may include any number of lanes.

Evacuation slide 18 includes an inflatable tube structure 34. In accordance with various embodiments, tube structure 34 includes a first (or upper) tube 36 and a second (or lower) tube 38. First and second tubes 36, 38 extend between head end 24 and toe end 26 and may generally define sliding surface 30. In the deployed state, first tube 36 is located generally over or above second tube 38 such that second tube 38 is located generally between first tube 36 and the exit surface (e.g., the ground or water). In various embodiments, first tube 36 and second tube 38 may be integrally formed and in fluid communication. Stated differently, first tube 36 and second tube 38 may be part of one interconnected chamber that fills with gas upon deployment of evacuation slide 18. In various embodiments, first tube 36 may be discrete or sealed (i.e., not in fluid communication) with respect to second tube 38. While evacuation slide 18 is illustrated as having an upper and a lower tube, it is contemplated and understood that evacuation slide 18 may include any number of tubes.

In various embodiments, evacuation slide 18 may include one or more transverse tube(s) 40 located on underside surface 32 and extending laterally between a first side 42 and a second side 44 of evacuation slide 18. Second side 44 is opposite first side 42. First and second sides 42, 44 may extend longitudinally between head end 24 and toe end 26. Transverse tubes 40 may be in fluid communication with first tube 36 and/or with second tube 38.

Figure 3A:
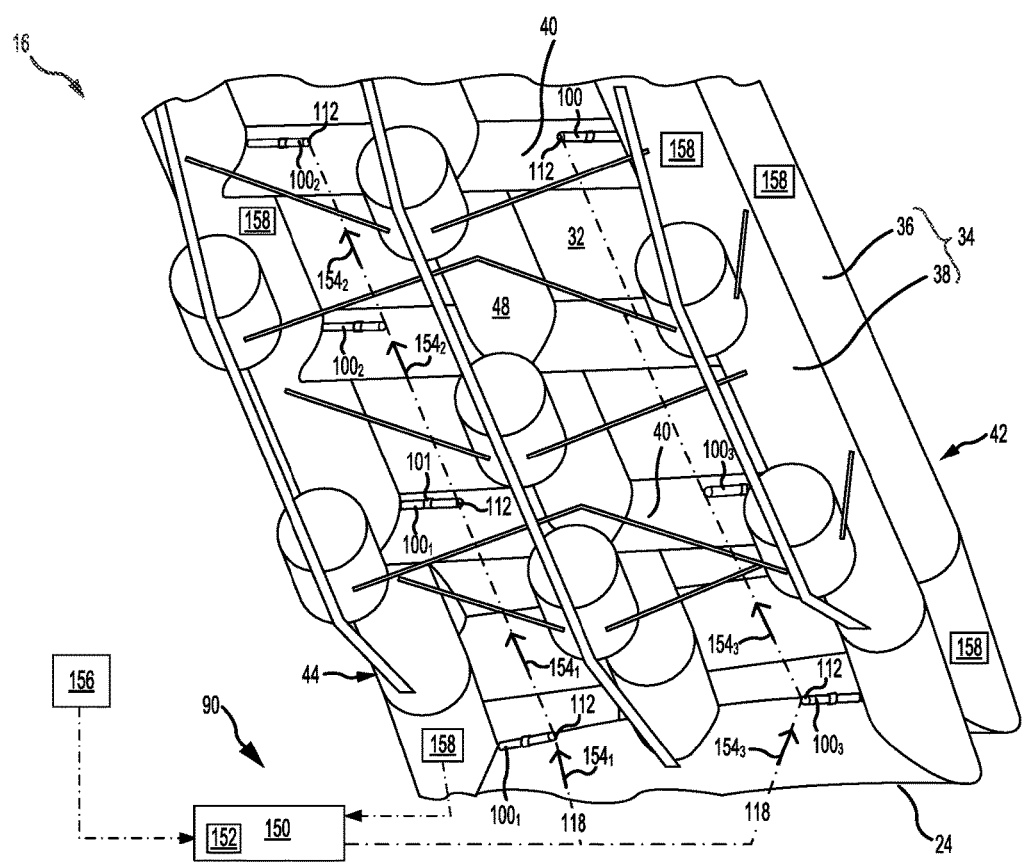
FIGS. 3A and 3B illustrate an inflation system for an evacuation system, in accordance with various embodiments.

With additional reference to FIG. 3A, underside surface 32 of evacuation slide 18 is illustrated. In various embodiments, evacuation slide 18 may include a longitudinal transverse tube 48 located on underside surface 32. Longitudinal transverse tube 48 may extend longitudinally and generally from head end 24 to toe end 26.

In accordance with various embodiments, evacuation system 16 may include an inflation system 90. Inflation system 90 is configured to inflate evacuation slide 18, in response to deployment of evacuation system 16 (e.g., in response to exit door 14 being opened or in response to a passenger or crew member depressing a button or actuating a lever). Inflation system 90 includes one or more inflators 100, such as inflators $100_1$, $100_2$, and $100_3$, fluidly coupled to tube structure 34. In various embodiments, inflators 100 may be mounted to transverse tubes 40, first tube 36, second tube 38, longitudinal transverse tube 48, underside surface 32, or any other desired location on evacuation slide 18. Inflators 100 may each be mounted to evacuation slide 18 via a strap 101.

Figure 4A:
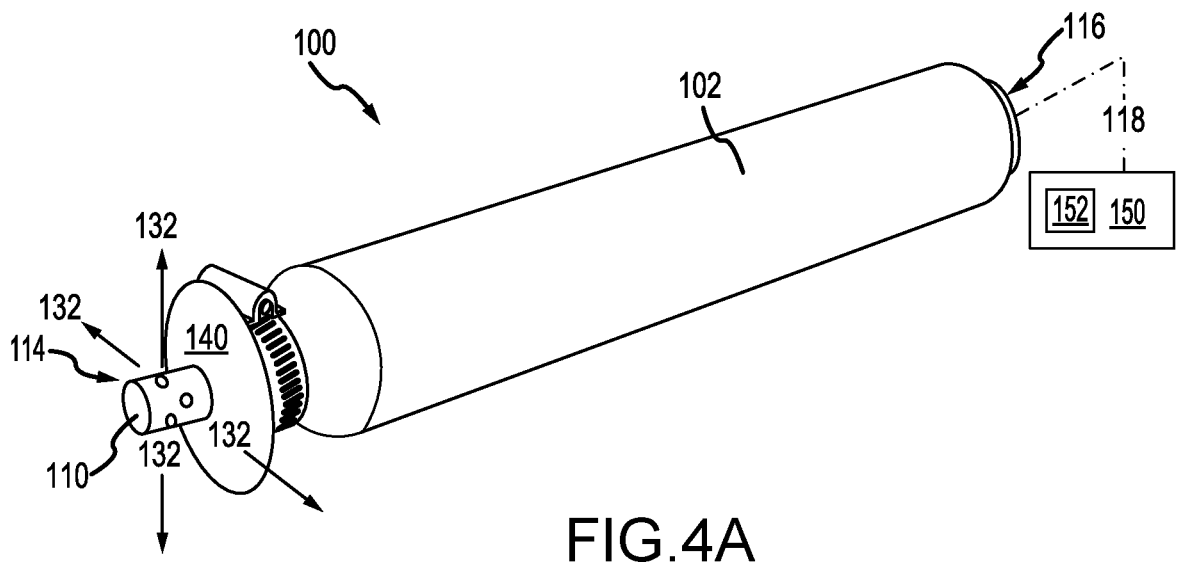
FIGS. 4A and 4B illustrate a perspective view and a cross-section view, respectively, of an inflator for an inflation system, in accordance with various embodiments.
Figure 4B:
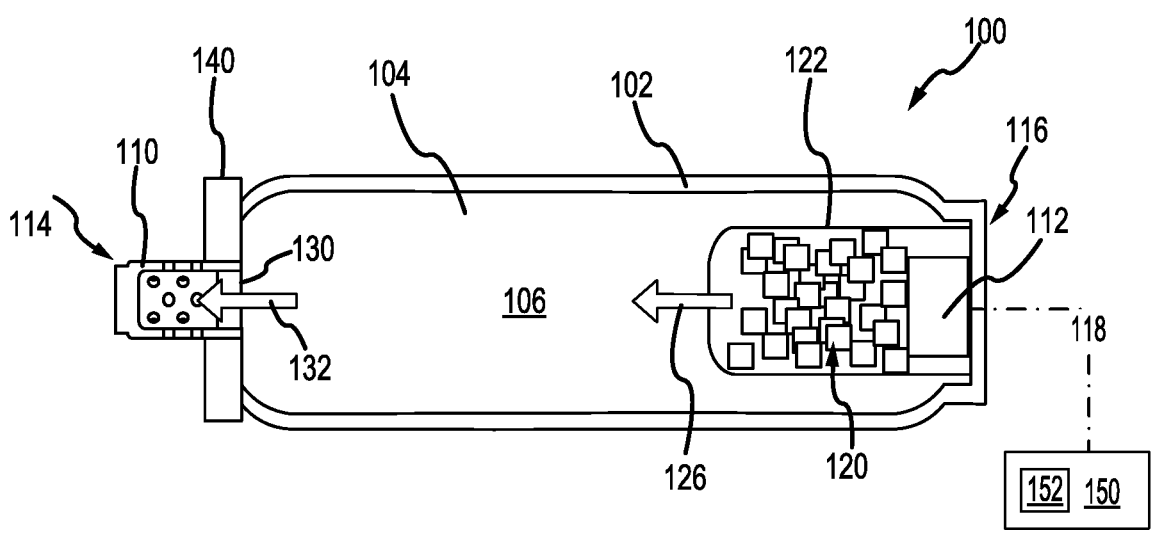

With additional reference to FIGS. 4A and 4B, an inflator 100 is illustrated. In accordance with various embodiments and as described below, inflator 100 may be a pyrotechnic inflator. In this regard, inflator 100 may include a solid gas generator material configured to produce a gas in response to ignition of an ignitor of inflator 100.

In accordance with various embodiments, inflator 100 may include a housing 102 and a cylinder 104 located within housing 102. Cylinder 104 includes a pressurized gas 106. Pressurized gas 106 may be nitrogen, carbon dioxide, helium, argon, or any other suitable pressurized gas. Inflator 100 includes a nozzle 110 and an igniter 112. Nozzle 110 may be located at a first end 114 of inflator 100. Igniter 112 may be located generally at a second end 116 of inflator 100, which is opposite first end 114. Igniter 112 may be electrically coupled to a link 118. Igniter 112 may be configured to ignite (i.e., fire) in response to receiving an electrical signal via link 118. A solid gas generating material 120 is located within a vessel 122 proximate second end 116. Solid gas generating material 120 may comprise sodium azide ($NaN_3$), ammonium perchlorate ($NH_4ClO_4$), perchloric acid ($HClO_4$), potassium perchlorate ($KClO_4$), sodium perchlorate ($NaClO_4$), sodium chlorate ($NaClO_3$), potassium chlorate ($KclO_3$), lithium chlorate ($LiClO_3$), and/or any suitable solid gas generating material.

Solid gas generating material 120 is thermally coupled to igniter 112 such that firing, or ignition, of igniter 112 generates a chemical reaction (e.g., combustion) of solid gas generating material 120, thereby generating gas 126. Gas 126 may flow from vessel 122 into cylinder 104. Gas 126 increases a pressure within cylinder 104. The increased pressure may break a seal 130 located between cylinder 104 and nozzle 110, thereby fluidly coupling nozzle 110 and cylinder 104. In other words, in response to seal 130 breaking (or being otherwise removed from between nozzle 110 and cylinder 104), a mixture 132 of pressurized gas 106 and gas 126 flows from cylinder 104 into nozzle 110. The mixture 132 then exits inflator 100 via nozzle 110 and flows into the inflatable (e.g., evacuation slide 18).

In accordance with various embodiments, inflator 100 may include a seal 140. Seal 140 may be located on housing 102. Seal 140 may form a sealing interface (i.e., an airtight seal) between inflator 100 and the inflatable structure (e.g., evacuation slide 18). In various embodiments, seal 140 may comprise a rubber flange and/or a band clamp and/or any other hardware capable of forming a sealing interface with the inflatable. In various embodiments, seal 140 may be located proximate first end 114. For example, seal 140 may be located between nozzle 110 and housing 102.

Returning to FIG. 3A, in accordance with various embodiments, inflation system 90 includes a controller 150. Controller 150 may be configured to control the ignition of inflators 100. In this regard, inflators 100 may be operationally coupled to controller 150. Controller 150 may be electrically coupled to inflators 100 via links 118. Links 118 may represent a wired communication, a wireless communication, a mechanical communication (i.e., a shaft, rod, lever, conduit, cord, etc.), or any other link capable of operatively coupling controller 150 to igniters 112. Controller 150 may be positioned on evacuation slide 18 or anywhere on aircraft 10. Controller 150 may be configured to inflate evacuation slide 18 (i.e., send electrical signals causing igniter 112 to ignite). Controller 150 may send the electrical signals, in response to deployment of evacuation system 16 (e.g., in response to exit door 14 being opened and/or in response to a passenger or crew member depressing a button or actuating a lever).

Controller 150 may include one or more processors and one or more tangible, non-transitory memories 152 and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. Controller 150 may control the deployment of evacuation slide 18 by controlling an ignition sequence of inflators 100. For example, in various embodiments, controller 150 may be configured to control the timing of ignite signals based on which part of the evacuation slide (e.g., head end, toe end, first tube, second tube, etc.) the inflator inflates. Stated differently, the timing of the ignite signals from controller 150 may be based on which part of the slide the inflator receiving the ignite signal is fluidly coupled.

Figure 3B:
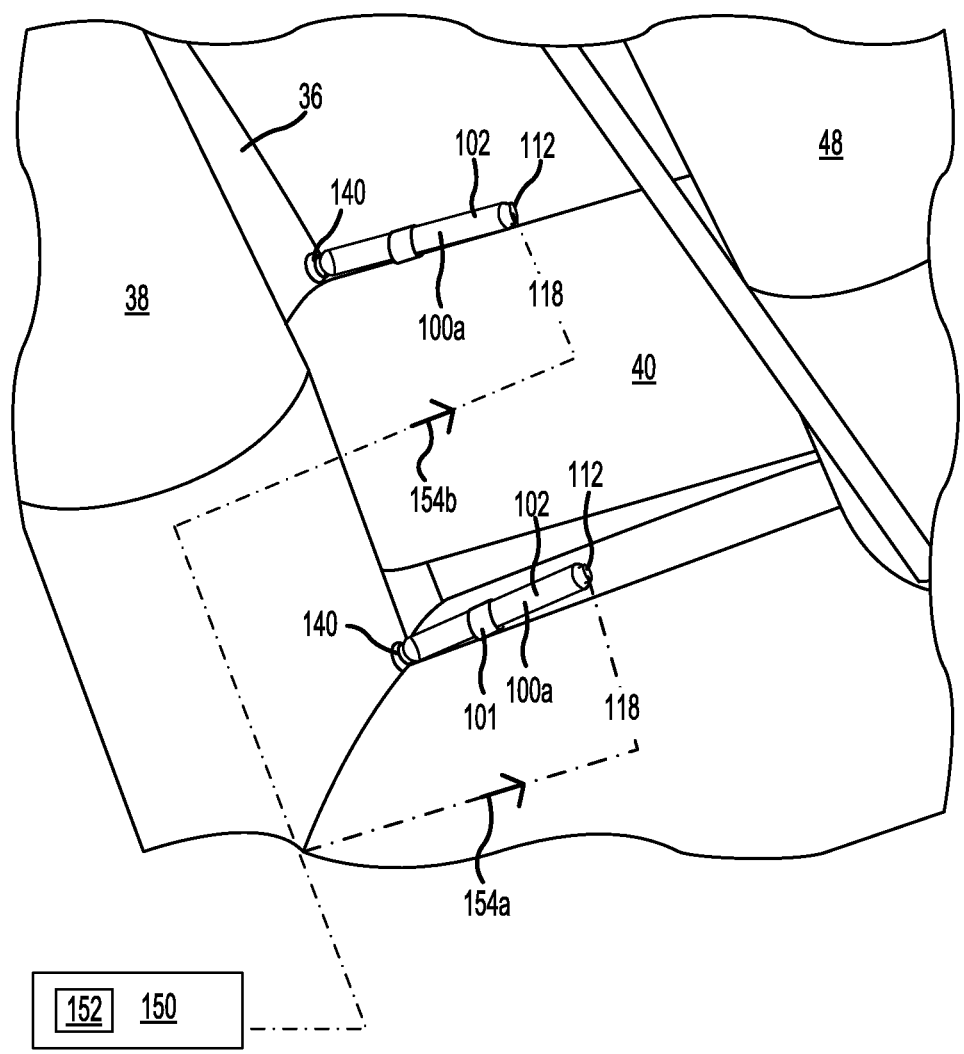

With reference to FIG. 3B, in various embodiments, a first group of inflators 100 (e.g., inflators 100$a$) may be fluidly coupled to first tube 36 and a second group of inflators 100 (e.g., inflators 100$b$) may be fluidly coupled to second tube 38. In this regard, inflators 100$a$ may inflate first tube 36 and inflators 100$b$ may inflate second tube 38. In various embodiments, controller 150 may be configured to cause, at least, a portion of first tube 36 to inflate prior to second tube 38. For example, in various embodiments, controller 150 may be configured to send an ignite signal 154$a$ to one or more of the inflators 100$a$ coupled to first tube 36, prior to sending an ignite signal 154$b$ to, at least, one of the inflators 100$b$ coupled to second tube 38.

Returning to FIG. 3A, in various embodiments, controller 150 may be configured to control the unfolding and/or deployment sequence of evacuation slide 18 by controlling an ignition timing of inflators 100. In various embodiments, controller 150 may be configured to start the inflation of head end evacuation slide 18 prior to toe end portions of evacuation slide 18. For example, controller 150 may send ignite signal $154_1$ to one or more inflators $100_1$ prior to sending ignite signal $154_2$ to one or more inflators $100_2$. Inflators $100_1$ may be located closer to head end 24 of evacuation slide 18, as compared to inflators $100_2$. In various embodiments, controller 150 may be configured to begin inflation of first side 42 of evacuation slide 18 prior to inflation of second side 44. For example, controller 150 may send ignite signal $154_3$ to one or more inflators $100_3$ prior to sending ignite signal $154_1$ to one or more inflators $100_1$. Inflators $100_3$ may be located closer to first side 42 of evacuation slide 18, as compared to inflators $100_1$.

In various embodiments, inflation system 90 includes one or more sensors 156 in communication with controller 150. Sensors 156 may be configured to measure environmental conditions. Sensors 156 may include, for example, temperature sensor(s) configured to output environmental temperature measurements to controller 150, wind speed sensor(s) configured to output windspeed measurements to controller 150, and/or sill height sensor(s) configured to output sill height measurements to controller 150. In various embodiments, sensors 156 may include sill height sensors configured to determine a sill height of exit door 14 by measuring a distance between the sill of exit door 14 (with momentary reference to FIG. 1) and an exit surface on which aircraft 10 is supported. In various embodiments, sensors 156 may include the sill height sensors configured to determine a sill height of exit door 14 based on a roll and/or a pitch of the aircraft.

In various embodiments, inflation system 90 may include one or more pressure sensor(s) 158 in communication with controller 150. Pressure sensors 158 are operationally coupled to tube structure 34. In this regard, pressure sensors 158 are configured to measure a pressure of tube structure 34. Pressure sensors 158 may located at various locations along first tube 36 and/or along second tube 38.

In accordance with various embodiments, controller 150 and/or tangible, non-transitory memory 152 may be pre-implemented with multiple ignition (i.e., firing) sequence configurations. Controller 150 may choose the desired, or optimal, ignition sequence for inflators 100 based on output from sensors 156. In various embodiments, controller 150 may determine to only ignite (i.e., fire) a certain set of inflators 100 based on the measurements received from sensors 156. For example, if controller 150 determines the sill height measurement is less than a predetermined threshold sill height, controller 150 may ignite a first set of inflators 100 configured to inflate evacuation slide to a first length. If controller 150 determines the sill height measurement is greater than the predetermined threshold sill height, controller 150 may ignite the first set of inflators 100 and a second set of inflators configured to inflate evacuation slide 18 to a second length greater than the first length. In various embodiments, if controller 150 determines the temperature measurement is greater than a threshold temperature, controller 150 may ignite a first set of inflators 100 configured to inflate evacuation slide to a first pressure. If controller 150 determines the temperature measurement is less than a threshold temperature, controller 150 may ignite the first set of inflators 100 and a second set of inflators 100 configured to introduce more gas to inflate evacuation slide to a pressure equal or similar to the first pressure. In this regard, based on the measurements from sensors 156 and/or from pressure sensors 158, controller may choose to ignite or not ignite certain inflators. In various embodiments, the location of which inflators to ignite may be determined based on the wind speed measurements from sensors 156. For example, in various embodiments, if the wind speed measurement is above wind speed threshold, controller 150 may ignite inflators 100 located along first side 42 and/or proximate to head end 24 prior to igniting the inflators located along second side 44 and/or proximate to toe end 26.

Controlling the ignition timing of inflators 100 may allow for increased control of the deployment sequence of evacuation slide 18, which may decrease a probability of the slide "kiting" under windy conditions. Controlling the deployment sequence of evacuation slide 18 via inflators 100 may allow for fewer releasable restraints controlling the unfolding sequence of evacuation slide 18, which tends to reduce a weight and or cost of evacuation slide 18. Further, inflators 100 may be associated with longer intervals between inspection, maintenance, and overhaul as compared to charged cylinders, which tends to reduce aircraft downtime and/or decrease maintenance and/or replacement costs.

Figure 5A:
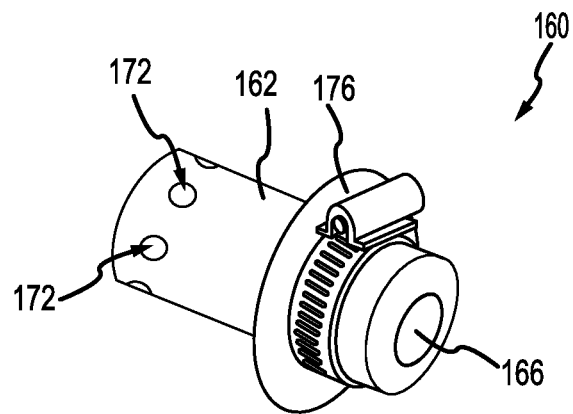
FIGS. 5A and 5B illustrate a perspective view and a cross-section view, respectively, of an inflator for an inflation system, in accordance with various embodiments.
Figure 5B:
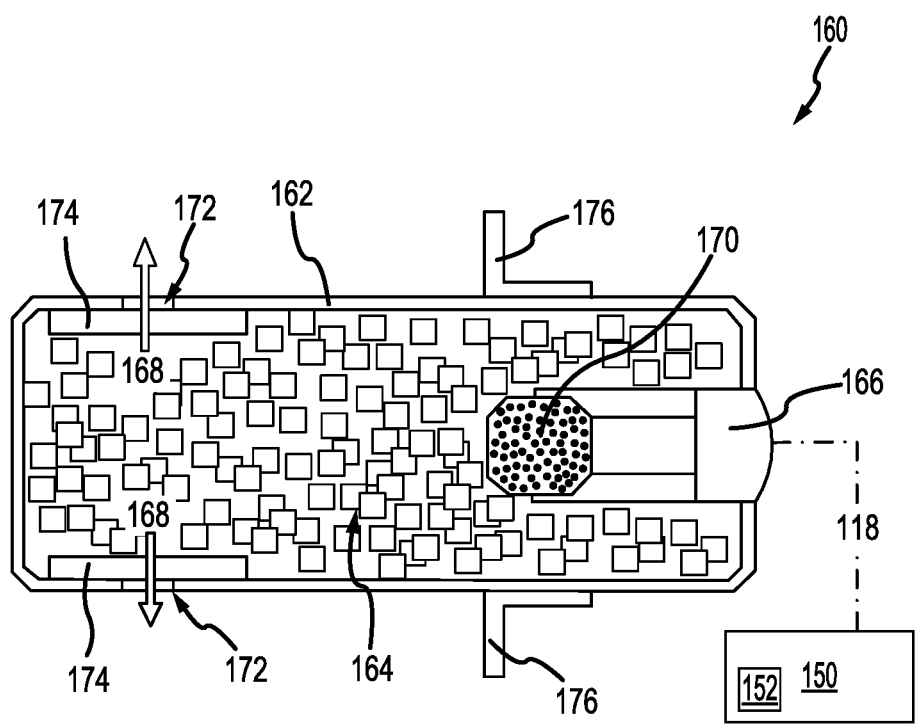

With reference to FIGS. 5A and 5B, an inflator 160 is illustrated. In accordance with various embodiments and as described below, inflator 160 may be a pyrotechnic inflator. In this regard, inflator 160 may include a solid gas generator material configured to produce a gas in response to ignition of an ignitor of inflator 160.

In accordance with various embodiments, inflator 160 includes a housing 162. A solid gas generating material 164, similar to solid gas generating material 120 in FIG. 4B, is located within housing 102. The solid gas generating material 164 is thermally coupled to igniter 166, such that firing or ignition of igniter 166 causes a chemical reaction (e.g., exothermic reduction or combustion reaction) of solid gas generating material 164, thereby generating a gas 168. In various embodiments, inflator 160 may include an enhancer 170, for example, a power propagator, located between igniter 166 and solid gas generating material 164. In various embodiments, ignition of igniter 166 ignites enhancer 170. Ignition of enhancer 170 causes a chemical reaction (e.g., exothermic reduction or combustion reaction) of enhancer 170, which ignites solid gas generating material 164, thereby causing a chemical reaction (e.g., exothermic reduction or combustion reaction) that generates gas 168. Gas 168 may exit inflator 160 via orifices 172. In various embodiments, gas 168 may flow through a filter 174 configured to decrease a temperature of gas 168. In various embodiments, filter 174 may be located between solid gas generating material 164 and orifices 172.

In accordance with various embodiments, inflator 160 may include a seal 176. Seal 176 may be located on housing 162. Seal 176 may form a sealing interface (i.e., an airtight seal) between inflator 160 and the inflatable structure (e.g., evacuation slide 18). In various embodiments, seal 176 may comprise a rubber flange and/or a band clamp and/or other hardware capable of forming a sealing interface with the inflatable.

In accordance with various embodiments, inflation system 90, with momentary reference to FIGS. 4A and 4B, may include one or more inflators 160 in place of one or more inflators 100. In this regard, igniter 166 of inflator 160 may be operationally and/or electrically coupled to controller 150 via link 118. Igniter 166 may be configured to ignite (i.e., fire) in response to receiving an electrical signal (e.g., an ignite signal) from controller 150 via link 118.

Figure 6:
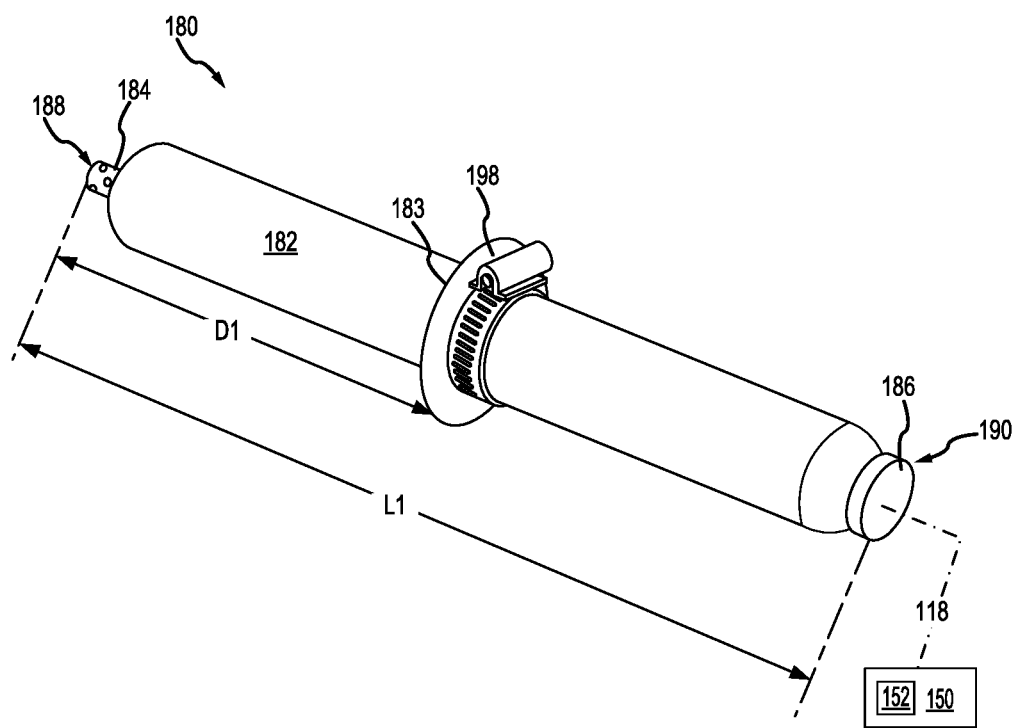
FIG. 6 illustrates a perspective view of an inflator for an inflation system, in accordance with various embodiments.

With reference to FIG. 6, an inflator 180 is illustrated. In accordance with various embodiments and as described below, inflator 180 may be a pyrotechnic inflator. In this regard, inflator 180 may include a solid gas generator material configured to produce a gas in response to ignition of an ignitor of inflator 180.

In accordance with various embodiments, inflator 180 includes housing 182. A cylinder including a pressurized gas, similar to cylinder 104 and a pressurized gas 106 in FIG. 4B, may be located within housing 182. Inflator 180 includes a nozzle 184 and an igniter 186. Nozzle 184 may be located at a first end 188 of inflator 180. Igniter 186 may be located generally at a second end 190 of inflator 180, which is opposite first end 188. In various embodiments, inflation system 90, with momentary reference to FIG. 4A, may include one or more inflators 180 in place of one or more inflators 100. In this regard, igniter 186 of inflator 180 may be operationally and/or electrically coupled to controller 150 via link 118. Igniter 186 may be configured to ignite (i.e., fire) in response to receiving an electrical signal (e.g., an ignite signal) from controller 150.

In accordance with various embodiments, inflator 180 includes a solid gas generating material located within a vessel proximate second end 190, similar to solid gas generating material 120 and vessel 122 in FIG. 4B. The solid gas generating material is thermally coupled to igniter 186, such that firing or ignition of igniter 186 causes a chemical reaction (e.g., exothermic reduction or combustion reaction) of solid gas generating material, thereby generating a gas. The gas from solid gas generating material flows into the cylinder, creating a mixture of the pressurized gas in the cylinder and the gas from the solid gas generating material. The gas mixture may exit inflator 180 via nozzle 184.

In accordance with various embodiments, inflator 180 may include a seal 198. Seal 198 may be located on housing 182. Seal 198 may form a sealing interface (i.e., an airtight seal) between inflator 180 and the inflatable structure (e.g., evacuation slide 18). In various embodiments, seal 198 may comprise a rubber flange and/or a band clamp and/or other hardware capable of forming a sealing interface with the inflatable. Inflator 180 may include a length L, extending from first end 188 to second end 190. A distance D1 between seal 198 and nozzle 184 may be between about 20% and about 80% of length L1, between about 35% and 65% percent of L1, or about 50% of length L1, wherein in the previous context only "about" means ±5%. first end 114.

Figure 7A:
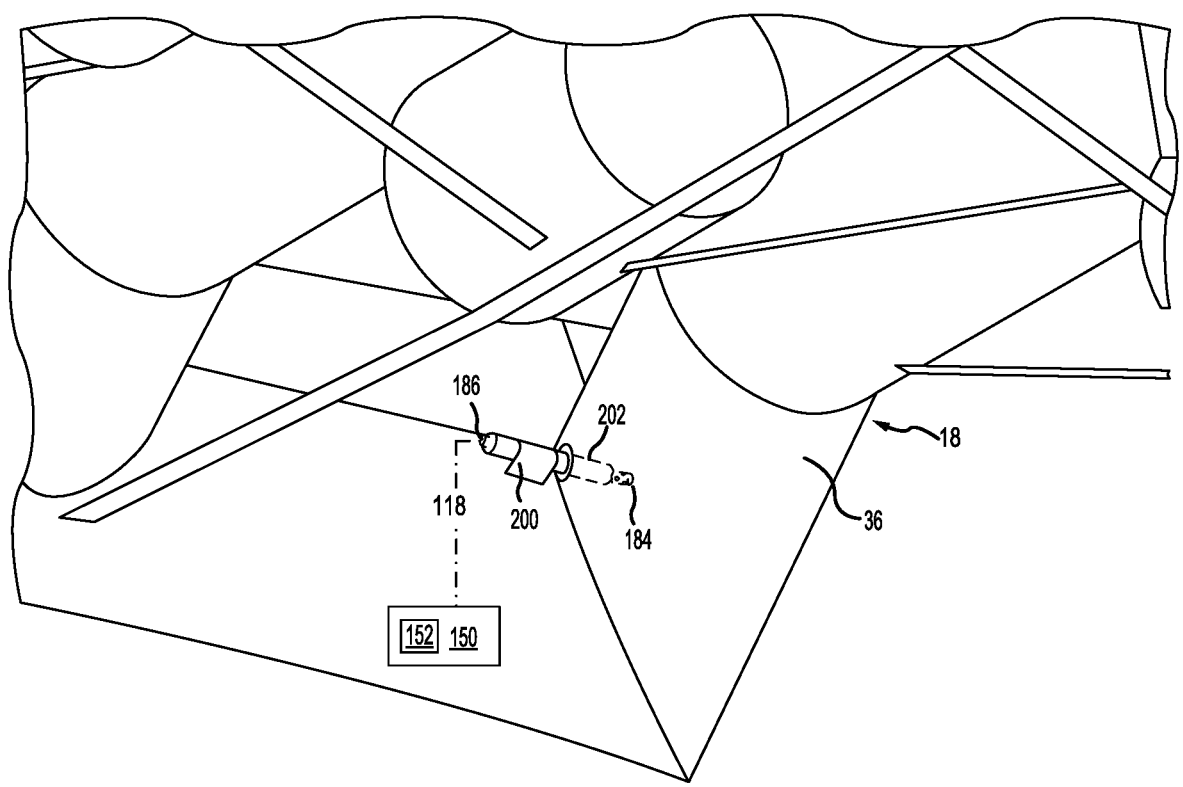
FIGS. 7A and 7B illustrate an inflation system for an evacuation system, in accordance with various embodiments.
Figure 7B:
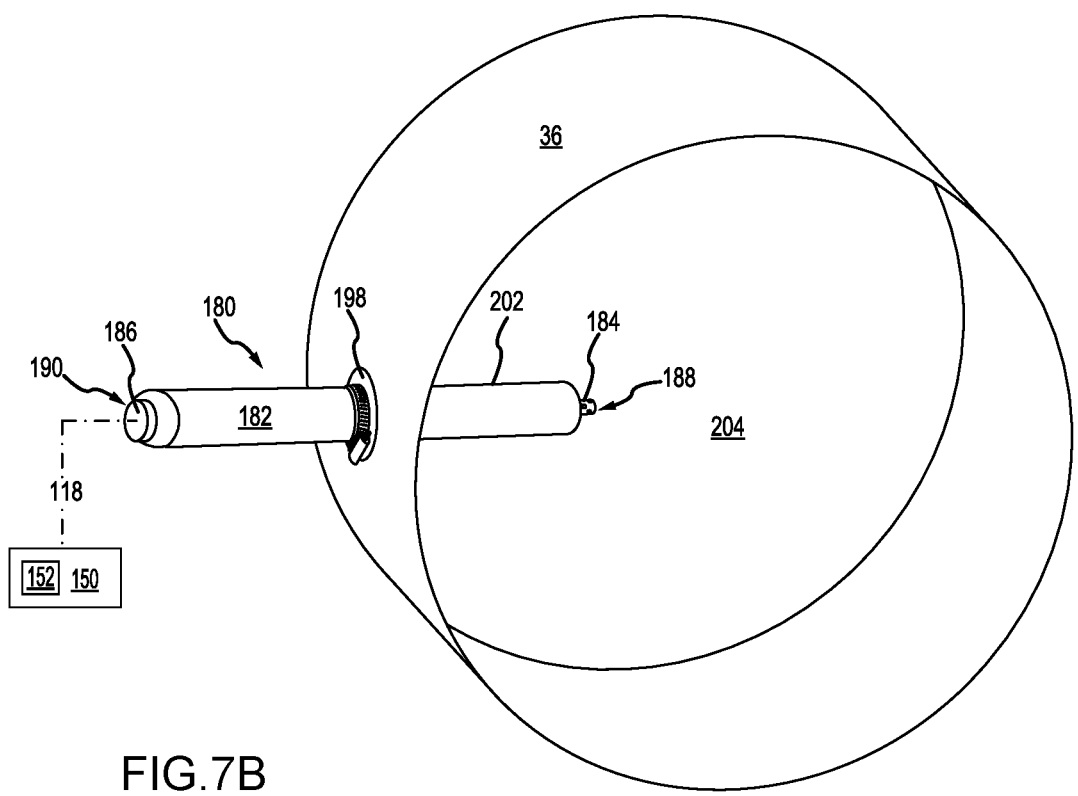

With reference to FIGS. 7A and 7B, an inflator 180 mounted to evacuation slide 18 is illustrated. In accordance with various embodiments, inflator 180 may be mounted to evacuation slide 18, for example, to first tube 36, via a strap 200. A portion 202 of inflator 180 is located with an internal volume 204 defined by evacuation slide 18, for example, defined by first tube 36. Stated differently, a portion 202 of inflator 180, which extends from seal 198 to nozzle 184, may be located with first tube 36.

Figure 8A:
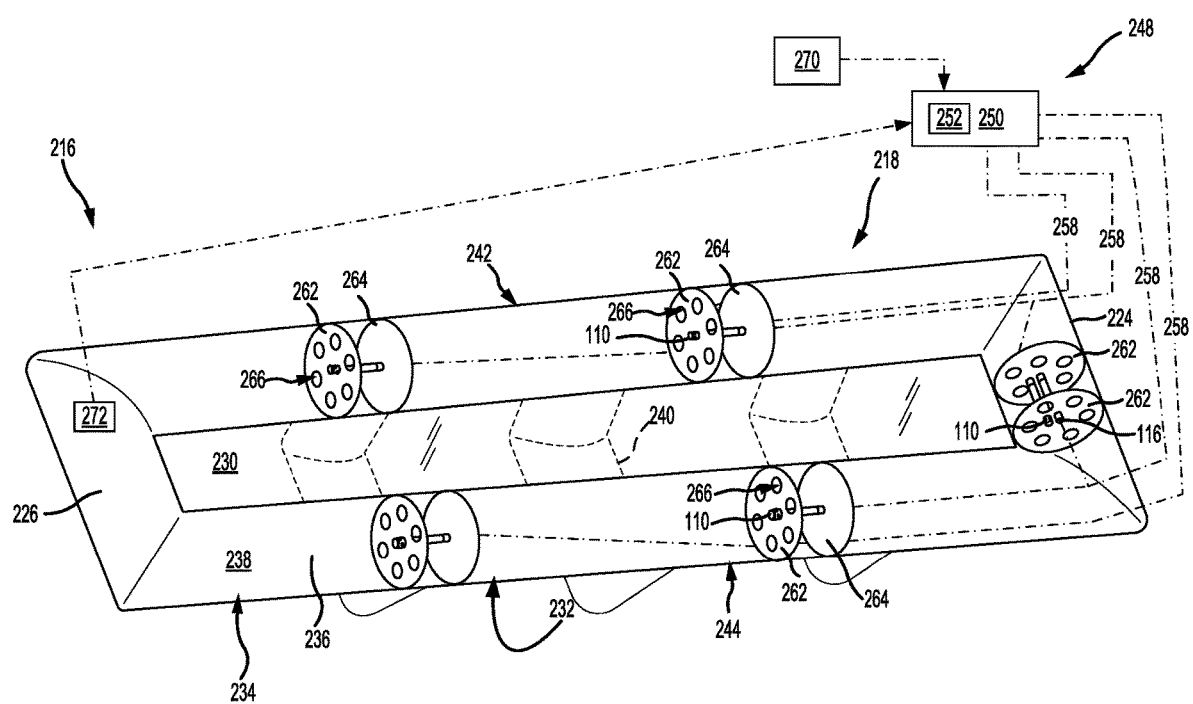
FIGS. 8A and 8B illustrate an inflation system for an evacuation system, in accordance with various embodiments.
Figure 8B:
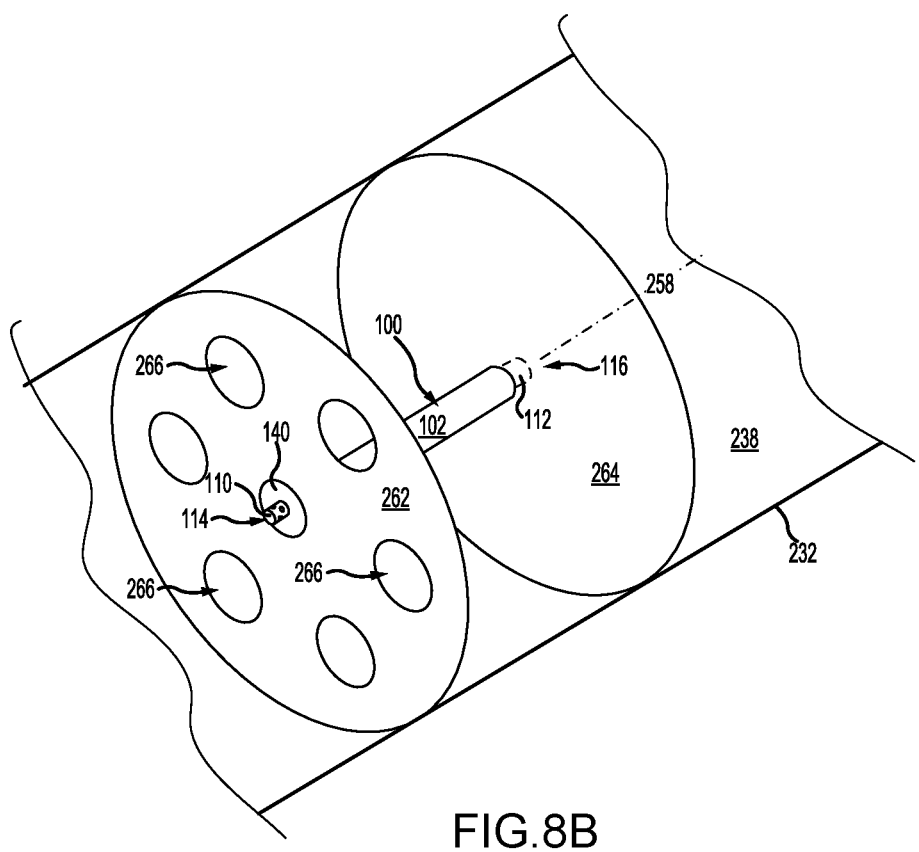

Referring now to FIGS. 8A and 8B, an evacuation system 216 having an evacuation slide 218 in an inflated or "deployed" position is illustrated. In various embodiments, aircraft 10 in FIG. 1 may include evacuation system 216 in place of evacuation system 16. In accordance with various embodiments, evacuation slide 218 includes a head end 224 and a toe end 226 opposite head end 224. Head end 224 may be coupled to an aircraft structure (e.g., fuselage 12 in FIG. 1). Evacuation slide 218 includes a sliding surface 230 and an underside surface 232 opposite sliding surface 230. Sliding surface 230 extends from head end 224 to toe end 226. In response to an evacuation event (i.e., to deployment of evacuation slide 18), underside surface 232 may be oriented toward an exit surface (e.g., toward the ground or toward a body of water).

Evacuation slide 218 includes an inflatable tube structure 234. In accordance with various embodiments, tube structure 34 includes a tube 236 that generally defines sliding surface 230. Tube 236 may comprise one interconnected chamber that fills with gas upon deployment of evacuation slide 218. While evacuation slide 218 is illustrated as having a single tube, it is contemplated and understood that evacuation slide 218 may include any number of tubes. For example, in various embodiments, evacuation slide 218 may include an upper tube and a lower tube, similar to evacuation slide 18 in FIG. 2.

In various embodiments, evacuation slide 218 may include one or more transverse tube(s) 240 located on underside surface 232 and extending laterally between a first side 242 and a second side 244 of tube 236. Transverse tubes 240 may be in fluid communication with tube 236.

In accordance with various embodiments, evacuation system 216 may include an inflation system 248. Inflation system 248 is configured to inflate evacuation slide 218, in response to deployment of evacuation system 216 (e.g., in response to exit door 14 being opened or in response to a passenger or crew member depressing a button or actuating a lever).

Inflation system 248 includes one or more inflators 100. In accordance with various embodiments, one or more the inflators 100 may be located completely within tube 236. In this regard, tube 236 may define an internal volume 238 and housing 102 of inflators 100 may be located completely within internal volume 238. While inflation system 248 is shown having inflators 100, it is further contemplated and understood that in various embodiments, inflation system 248 may include one or more inflators 160, with momentary reference to FIGS. 5A and 5B, in place of or in addition to inflators 100.

In various embodiments, inflators 100 may supported by, and/or located through, one or more internal panels, such as first internal panel 262 and second internal panel 264. First and second internal panels 262, 264 may be formed from the same type of fabric as inflatable tube structure 234 and/or any other suitable material. In various embodiments, an internal surface of first and/or second internal panels 262, 264 may be coated with polyurethane or other material configured to make the surfaces of first and/or second internal panels 262, 264 impermeable to gas.

In various embodiments, first internal panel 262 may define one or more panel openings 266 and may be located proximate first end 114 of inflator 100. Second internal panel 264 may be located proximate second end 116 of inflator 100. At least, a portion of nozzle 110 may extend from first internal panel 262 away from second internal panel 264. First and second internal panels 262, 264 may be attached to tube 236. In various embodiments, second internal panel 264 may form a sealing interface with inflator 100 and with tube 236, such that fluid (e.g., gas) may not flow past second internal panel 264.

In various embodiments, head end 224 of evacuation slide 218 may include, at least, two first panels 262 having panel openings 266, and at least, two inflators 100, with the nozzles 110 of the inflators 100 oriented away from one another. For example, at head end 224, the nozzle 110 of a first inflator 100 is oriented toward first side 242 and the nozzle 110 of a second inflator 100 is oriented toward second side 244.

In accordance with various embodiments, inflation system 248 includes a controller 250. Controller 250 may be configured to control the ignition of inflators 100. In this regard, inflators 100 may be operationally coupled to controller 250. Controller 250 may be electrically coupled to inflators 100 via links 258. Links 258 may represent a wired communication, a wireless communication, a mechanical communication (i.e., a shaft, rod, lever, conduit, cord, etc.) or any other link capable of operatively coupling controller 250 to igniter 112 of inflators 100. Links 258 may be located, at least, partially within internal volume 238.

Controller 250 may be positioned on evacuation slide 218 or anywhere on aircraft 10 in FIG. 1. Controller 250 may be configured to inflate evacuation slide 218 (i.e., send electrical signals causing igniters 112 to ignite), in response to deployment of evacuation system 216 (e.g., in response to exit door 14 being opened and/or in response to a passenger or crew member depressing a button or actuating a lever).

In various embodiments, inflation system 248 includes one or more sensors 270 in communication with controller 250. Sensors 270 may be configured to measure environmental conditions. Sensors 270 may include, for example, temperature sensor(s) configured to output environmental temperature measurements to controller 250, wind speed sensor(s) configured to output windspeed measurements to controller 250, and/or sill height sensor(s) configured to output a sill height measurement to controller 250. The sill height measurement may correspond to a distance between a sill of exit door 14 (with momentary reference to FIG. 1) and an exit surface on which aircraft 10 is supported. In various embodiments, sensors 156 may include the sill height sensors configured to determine a sill height of exit door 14 based on a roll and/or a pitch of the aircraft.

In various embodiments, inflation system 248 may include one or more pressure sensor(s) 272 in communication with controller 250. Pressure sensors 272 are operationally coupled to tube structure 234. In this regard, pressure sensors 272 are configured to measure a pressure of inflatable tube structure 234. Pressure sensors 158 may located at one or more locations along tube structure 234.

Controller 250 may include one or more processors and one or more tangible, non-transitory memories 252 and be capable of implementing logic. The processor can be a general purpose processor, a DSP, an ASIC, a FPGA or other programmable logic device, discrete gate or transistor logic, discrete hardware components, or a combination thereof. Controller 250 may control the deployment of evacuation slide 218 by controlling an ignition sequence of inflators 100.

In accordance with various embodiments, controller 250 and/or tangible, non-transitory memory 252 may be pre-implemented with multiple ignition sequence configurations. Controller 250 may choose the desired, or optimal, ignition sequence for inflators 100 based on output from sensors 270 and/or from pressure sensors 272. In various embodiments, controller 250 may determine to only ignite a certain set of inflators 100 based on the measurements received from sensors 270 and/or from pressure sensors 272.

Controlling the ignition timing of inflators 100 may allow for increased control of the deployment sequence of evacuation slide 218, which may decrease a probability of the slide "kiting" under windy conditions. Controlling the deployment sequence of evacuation slide 218 via inflators 100 may allow for fewer releasable restraints controlling the unfolding sequence of evacuation slide 218, which tends to reduce a weight and or cost of evacuation slide 218. Further, inflators 100 may be associated with longer intervals between inspection and maintenance and overhaul as compared to charged cylinders, which tends to reduce aircraft downtime and/or decrease maintenance and/or replacement costs.

Figure 9:
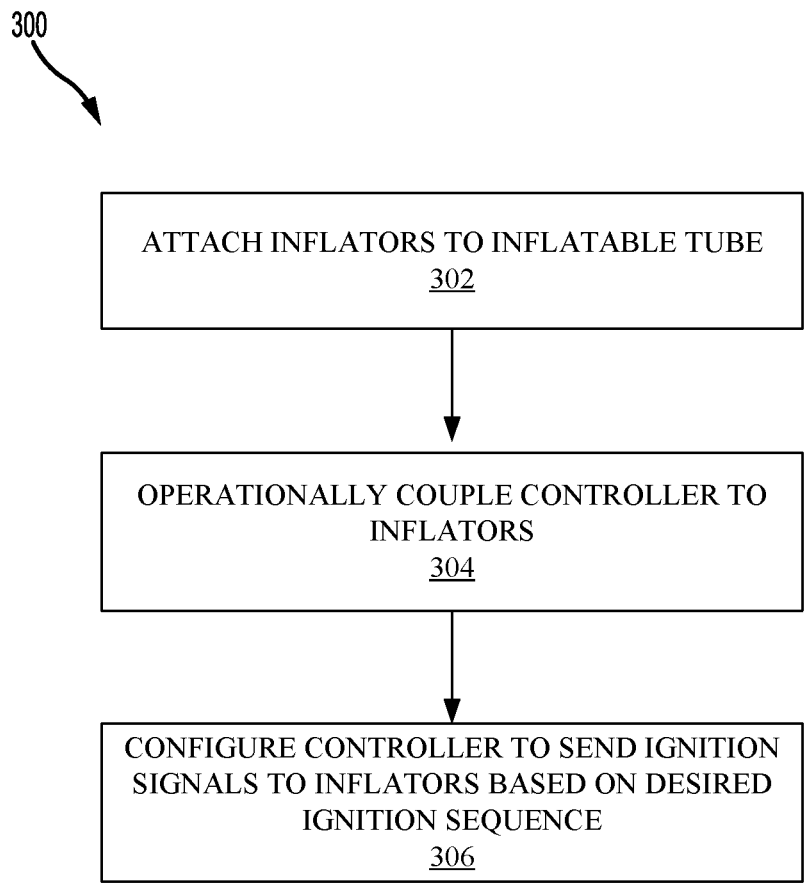
FIG. 9 illustrate a method of forming an inflation system for an evacuation system, in accordance with various embodiments.

With additional reference to FIG. 9, a method 300 of forming an inflation system for an evacuation system is illustrated. In accordance with various embodiments, method 300 may include the steps of attaching one or more inflator(s) to an inflatable tube (step 302). In various embodiments, step 302 may include attaching a first inflator 100 to, for example, first tube 36. In various embodiments, step 302 may further include attaching a second inflator 100 to, for example, first tube 36 or second tube 38. In various embodiments, step 302 may include locating a portion of the inflator within a volume defined by the inflatable tube. For example, with reference to FIG. 7B, in various embodiments, step 302 may include locating portion 202 of inflator 180 within the internal volume 204 defined by first tube 36.

Method 300 may further include operationally coupling a controller to the inflators (step 304). Step 304 may include operationally coupling controller 150 to inflators 100. In various embodiments, method 300 may further include configuring the controller to send ignite signals to the inflators (step 306). In various embodiments, step 306 may include configuring controller 150 to send a first ignite signal to a first inflator 100 and to send a second ignite signal to a second inflator 100. In various embodiments, step 306 may include operationally coupling a sensor (e.g., sensors 156) to controller 150 and configuring controller 150 to determine an ignition sequence for sending the first and second ignite signals based on output received from the sensor.

Figure 10:
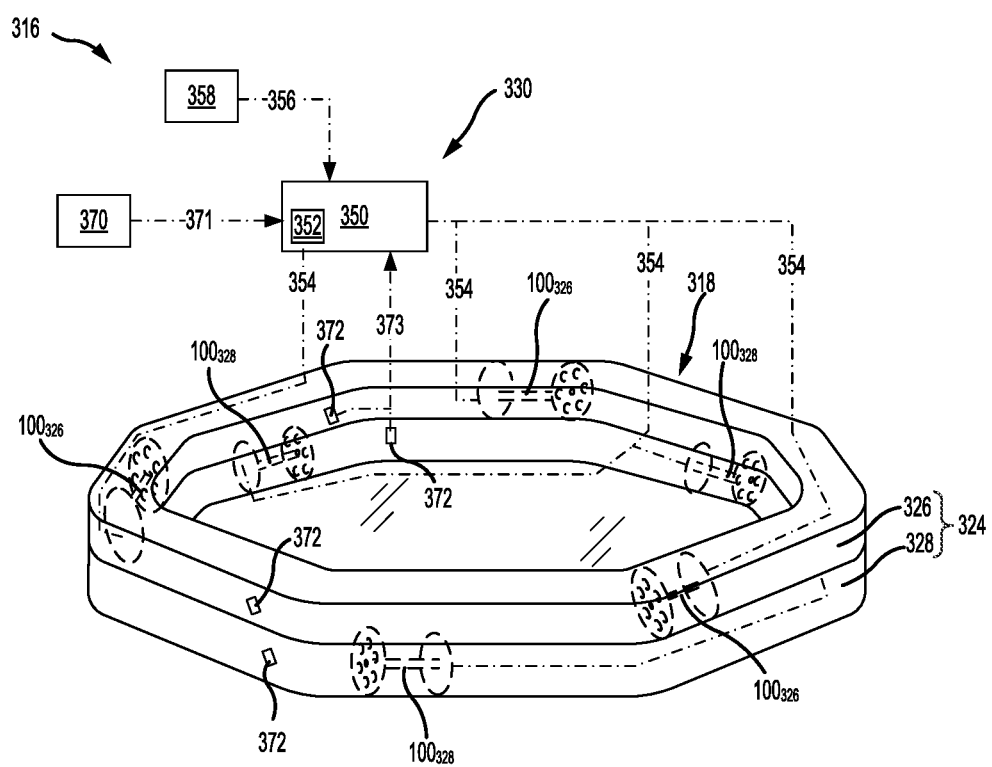
FIG. 10 illustrates an inflation system for an evacuation system, in accordance with various embodiments.

With reference to FIG. 10, an evacuation system 316 including an inflatable 318 is illustrated in an inflated or "deployed" position. In accordance with various embodiments, inflatable 318 is a life raft. Inflatable 318 (also referred to as life raft 318) may be configured to support evacuees in a water evacuation. Life raft 318 includes an inflatable tube structure 324 configured to fill with gas upon deployment of life raft 318. In various embodiments, tube structure 234 may include an upper (or first) tube 326 and a lower (or second) tube 328. Lower tube 328 may be located generally in and/or generally closer to the water, as compared to upper tube 326. While life raft 318 is illustrated as having an upper and a lower tube, it is contemplated and understood that life raft 318 may include any number (one, three, four, etc.) of tubes.

In accordance with various embodiments, evacuation system 316 may include an inflation system 330. Inflation system 330 is configured to inflate life raft 318. Inflation system 330 includes one or more inflators 100, such as, inflators $100_{326}$ and inflators $100_{328}$. In various embodiments, a first set of inflators $100_{326}$ may be located in upper tube 326 and a second set of inflators $100_{328}$ may be located in lower tube 328. Inflators $100_{326}$ may be configured to inflate upper tube 326. Inflators $100_{328}$ may be configured to inflate lower tube 328. In various embodiments, inflators $100_{326}$ may be supported by panels located completely within an internal volume of upper tube 326, and inflators $100_{328}$ may be supported by panels located completely within an internal volume of lower tube 328, similar to inflators 100 in FIGS. 8A and 8B. In various embodiments, inflators $100_{326}$ may be located partially within the internal volume of upper tube 326, and/or inflators $100_{328}$ may be located partially within the internal volume of lower tube 328, similar to inflators 180 in FIG. 7A. In various embodiments, just the nozzle portions of inflators $100_{326}$ may be located in the internal volume of upper tube 326, and/or just the nozzle portions of inflators $100_{328}$ may be located in the internal volume of lower tube 328, similar to inflators 100 in FIG. 3A. In various embodiments, inflation system 330 may include one or more inflators 160, with momentary reference to FIGS. 5A and 5B, in place of one or more of the inflators $100_{326}$, $100_{328}$, or in addition to inflators $100_{326}$, $100_{328}$.

In accordance with various embodiments, inflation system 330 includes a controller 350. Controller 350 may be configured to control the ignition of inflators $100_{326}$, $100_{328}$. In this regard, inflators $100_{326}$, $100_{328}$ may be operationally coupled to controller 350. Controller 350 may include one or more processors and one or more tangible, non-transitory memories 352 and be capable of implementing logic. The processor can be a general purpose processor, a DSP, an ASIC, a FPGA or other programmable logic device, discrete gate or transistor logic, discrete hardware components, or a combination thereof. Controller 350 may control the deployment of life raft 318 by controlling an ignition sequence of inflators $100_{326}$, $100_{328}$.

Controller 350 may be electrically coupled to inflators $100_{326}$, $100_{328}$ via links 354. Links 354 may represent a wired communication, a wireless communication, a mechanical communication (i.e., a shaft, rod, lever, conduit, cord, etc.) or any other link capable of operatively coupling controller 350 to igniters 112 (FIG. 4B) of inflators $100_{326}$, $100_{328}$. In various embodiments, links 354 may be located, at least, partially within the internal volume of tube structure 324.

In various embodiments, controller 350 may be positioned on life raft 318. Controller 350 may be configured to inflate life raft 318 (i.e., send electrical signals causing the inflator igniters to ignite), in response to receiving a deployment signal 356 from a deployment initiator 358. Controller 350 may receive deployment signal 356 in response to an evacuee actuating deployment initiator 358, for example, pressing a button, actuating a lever, pulling a lanyard, etc.

In various embodiments, inflation system 330 includes one or more sensors 370 in communication with controller 350. Sensors 370 may be configured to measure environmental conditions. Sensors 370 may include, for example, temperature sensor(s) configured to output environmental temperature measurements 371 to controller 350. In various embodiments, inflation system 330 may include one or more pressure sensor(s) 372 in communication with controller 350. Pressure sensors 372 are operationally coupled to tube structure 324. In this regard, pressure sensors 372 are configured to measure a pressure of tube structure 324. Pressure sensors 372 may located at one or more locations along tube structure 324 (for example, along upper tube 326 and lower tube 328). Pressure sensors 372 may output pressure measurement 373 to controller 350.

In various embodiments, controller 350 and/or tangible, non-transitory memory 352 may be pre-implemented with multiple ignition sequence configurations. Controller 350 may choose the desired, or optimal, ignition sequence for inflators $100_{326}$, $100_{328}$ based on output from sensors 370 and/or from pressure sensors 372. In various embodiments, controller 350 may determine to only ignite a certain inflators $100_{326}$, $100_{328}$ based on the measurements received from sensors 370 and/or from pressure sensors 372.

Controlling the ignition of inflators $100_{326}$, $100_{328}$ may allow for increased control of the operating pressure of life raft 318, which may decrease a probability of over inflation or underinflation due to environmental conditions. Further, inflators $100_{326}$, $100_{328}$ may be associated with longer intervals between inspection and maintenance and overhaul as compared to charged cylinders, which tends to reduce aircraft downtime and/or decrease maintenance and/or replacement costs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflation system for an inflatable, comprising:
  a first inflator including:
    a solid gas generating material; and
    an igniter configured to ignite in response to receiving a first ignite signal, wherein the solid gas generating material is configured to generate a gas in response to an ignition of the igniter;
  a first panel located in an interior volume of the inflatable, wherein the first panel comprises a plurality of panel openings, wherein the first inflator is located through a first opening of the plurality of panel openings in the first panel, and wherein other openings in the plurality of openings allow the gas to flow through the first panel;
  a second panel located in the interior volume of the inflatable, wherein the second panel forms a sealing interface such that the gas is prevented from flowing through the second panel; and
  a controller operationally coupled to the first inflator and configured to send the first ignite signal to the first inflator.

2. The inflation system of claim 1, further comprising a second inflator operationally coupled to the controller, wherein the second inflator is located through a second opening of the plurality of panel openings in the first panel, wherein the controller is configured to send a second ignite signal to the second inflator, and wherein the controller is configured to send the first ignite signal to the first inflator prior to sending the second ignite signal to the second inflator.

3. The inflation system of claim 2, further comprising:
  a first sensor in communication with the controller;
  a tangible, non-transitory memory configured to communicate with the controller, the tangible, non-transitory memory having instructions stored thereon that, in response to execution by the controller, cause the controller to perform operations comprising:
    receiving, by the controller, an output from the first sensor; and
    determining, by the controller, an ignition sequence for the first inflator and the second inflator based on the output from the first sensor.

4. The inflation system of claim 3, wherein the first sensor is configured to measure at least one of a temperature, a wind speed, or a sill height.

5. The inflation system of claim 4, further comprising a second sensor in communication with the controller, wherein the second sensor is configured to measure a pressure of the inflatable.

6. The inflation system of claim 4, wherein the inflatable comprises an evacuation slide, and wherein the first inflator is located closer to a head end of the evacuation slide as compared to the second inflator.

7. The inflation system of claim 1, wherein the inflatable includes at least one of an evacuation slide or a life raft.

8. An evacuation system, comprising:
  an inflatable; and
  a first inflator configured to inflate the inflatable, the first inflator including:
    a solid gas generating material; and
    a first igniter configured to ignite in response to receiving a first electrical signal, wherein the solid gas generating material is configured to generate a gas in response to an ignition of the first igniter;
  a first panel located in an interior volume of the inflatable, wherein the first panel comprises a plurality of panel openings, wherein the first inflator is located through a first opening of the plurality of panel openings in the first panel, and wherein other openings in the plurality of openings allow the gas to flow through the first panel;
  a second panel located in the interior volume of the inflatable, wherein the second panel forms a sealing interface such that the gas is prevented from flowing through the second panel; and
  a controller operationally coupled to the first inflator and configured to send the first electrical signal to the first inflator.

9. The evacuation system of claim 8, further comprising a second inflator operationally coupled to the controller, the second inflator including a second igniter configured to ignite in response to receiving a second electrical signal from the controller, wherein the second inflator is located through a second opening of the plurality of panel openings in the first panel.

10. The evacuation system of claim 9, wherein the controller is configured to send the first electrical signal prior to the second electrical signal.

11. The evacuation system of claim 9, further comprising:
a first sensor in communication with the controller, wherein the first sensor is configured to measure at least one of a temperature, a wind speed, or a sill height;
a tangible, non-transitory memory configured to communicate with the controller, the tangible, non-transitory memory having instructions stored thereon that, in response to execution by the controller, cause the controller to perform operations comprising:
receiving, by the controller, at least one of a temperature measurement, a wind speed measurement, or a sill height measurement from the first sensor; and
determining, by the controller, an ignition sequence for the first inflator and the second inflator based on the at least one of the temperature measurement, the wind speed measurement, or the sill height measurement.

12. The evacuation system of claim 11, further comprising a second sensor in communication with the controller, the second sensor being configured to measure a pressure of the inflatable.

13. The evacuation system of claim 8, wherein the first inflator includes:
a nozzle located at an end of the first inflator opposite the solid gas generating material; and
a seal configured to form a sealing interface with the inflatable, and wherein a portion of the first inflator extending from the seal to the nozzle is located in an internal volume defined by the inflatable.

14. The evacuation system of claim 8, further comprising a second inflator located through the first panel, wherein a first nozzle of the first inflator is oriented away from a second nozzle of the second inflator and wherein the first inflator is located through a first opening of the plurality of panel openings in the first panel.

15. A method of forming an inflation system, comprising:
locating a first panel in an interior volume of an inflatable, wherein the first panel comprises a plurality of panel openings;
locating a second panel located in the interior volume of the inflatable, wherein the second panel forms a sealing interface such that a gas is prevented from flowing through the second panel;
locating a first inflator through a first opening of the plurality of panel openings in the first panel in the interior volume of the inflatable, the first inflator, including:
a solid gas generating material; and
an igniter configured to ignite in response to receiving an electrical signal, wherein the solid gas generating material is configured to generate the gas in response to an ignition of the igniter;
operationally coupling a controller to the first inflator; and
configuring the controller to send a first ignite signal to the first inflator,
wherein other openings in the plurality of openings allow the gas to flow through the first panel.

16. The method of claim 15, further comprising:
locating a second inflator through a second opening of the plurality of panel openings in the first panel located in the interior volume of the inflatable; and
configuring the controller to send a second ignite signal to the second inflator.

17. The method of claim 16, further comprising:
operationally coupling a sensor to the controller; and
configuring the controller to determine an ignition sequence for sending the first ignite signal and the second ignite signal based on an output from the sensor.

18. The method of claim 16, wherein locating the second inflator through the second opening in the first panel includes orienting a second nozzle of the second inflator away from a first nozzle of the first inflator.

* * * * *